United States Patent
Lin et al.

(10) Patent No.: US 12,446,109 B2
(45) Date of Patent: Oct. 14, 2025

(54) MUSIM SR PROCEDURE AND MM CONGESTION CONTROL

(71) Applicant: MEDIATEK INC., Hsin-Chu (TW)

(72) Inventors: Yuan-Chieh Lin, Hsin-Chu (TW); Pan-Yen Chiang, Hsin-Chu (TW); Chien-Chun Huang-Fu, Hsin-Chu (TW)

(73) Assignee: MediaTek Inc., Hsinchu (TW)

( * ) Notice: Subject to any disclaimer, the term of this patent is extended or adjusted under 35 U.S.C. 154(b) by 378 days.

(21) Appl. No.: 17/901,844

(22) Filed: Sep. 1, 2022

(65) Prior Publication Data
US 2023/0101341 A1 Mar. 30, 2023

Related U.S. Application Data

(60) Provisional application No. 63/249,076, filed on Sep. 28, 2021.

(51) Int. Cl.
*H04W 76/36* (2018.01)
*H04W 8/02* (2009.01)
(Continued)

(52) U.S. Cl.
CPC ............ *H04W 76/36* (2018.02); *H04W 8/02* (2013.01); *H04W 28/0289* (2013.01); *H04W 88/06* (2013.01)

(58) Field of Classification Search
CPC ..... H04W 28/028; H04W 48/18; H04W 8/10; H04W 60/06; H04W 28/0289;
(Continued)

(56) References Cited

U.S. PATENT DOCUMENTS

| | | | |
|---|---|---|---|
| 8,977,227 B2 * | 3/2015 | Tiwari | H04W 4/90 455/404.1 |
| 9,426,687 B2 * | 8/2016 | Liao | H04W 76/18 |

(Continued)

FOREIGN PATENT DOCUMENTS

| | | | |
|---|---|---|---|
| EP | 4156808 A1 * | 3/2023 | ........ H04W 28/0289 |
| WO | WO2017054767 A1 | 4/2017 | |

(Continued)

OTHER PUBLICATIONS

Xincheng Zhang, "Signaling-Based Optimization," in LTE Optimization Engineering Handbook , IEEE, 2017, pp. 780-801, doi: 10.1002/9781119158981.ch18. (Year: 2017).*

(Continued)

*Primary Examiner* — William D Cumming
(74) *Attorney, Agent, or Firm* — Helen Mao; Zheng Jin; Imperium Patent Works

(57) ABSTRACT

A method of handling NAS signaling connection release under mobility management congestion control for MUSIM UE is proposed. A MUSIM UE has established a NAS signaling connection on a first USIM in connected mode. Later on, the MUSIM UE has more important job to be started on the second USIM. The MUSIM UE wishes to initiate a service request procedure by transmitting a service request to the network, to release the NAS signaling connection on the first USIM. However, under the 5GMM/EMM signaling congestion condition with timer T3346 running, the AMF/MME rejects 5GMM/EMM signaling requests from UE. In one novel aspect, the MUSIM UE requests the network to release the NAS signaling connection while timer T3346 is still running. As a result, the MUSIM UE is able to start the more important job on the second USIM, or to improve user experience on the second USIM.

14 Claims, 4 Drawing Sheets

(51) Int. Cl.
*H04W 28/02* (2009.01)
*H04W 88/06* (2009.01)

(58) Field of Classification Search
CPC ..... H04W 80/10; H04W 76/10; H04W 76/15; H04W 76/18; H04W 4/90; H04W 48/06
USPC .......... 455/435, 435.1, 404.1; 370/329, 229, 370/230
See application file for complete search history.

(56) References Cited

U.S. PATENT DOCUMENTS

| | | | | |
|---|---|---|---|---|
| 9,491,732 | B2* | 11/2016 | Wang | H04W 64/00 |
| 11,419,048 | B2* | 8/2022 | Aramoto | H04W 48/18 |
| 11,483,880 | B2* | 10/2022 | Aramoto | H04W 28/0289 |
| 11,696,170 | B2* | 7/2023 | Huang-Fu | H04W 76/10 370/229 |
| 2013/0012204 | A1* | 1/2013 | Kim | H04W 60/06 455/435.1 |
| 2014/0064069 | A1* | 3/2014 | Liao | H04W 76/18 370/230 |
| 2019/0200208 | A1* | 6/2019 | Chandramouli | H04W 80/10 |
| 2019/0357118 | A1* | 11/2019 | Kim | H04W 48/06 |
| 2019/0373441 | A1* | 12/2019 | Ryu | H04W 48/18 |
| 2020/0336935 | A1* | 10/2020 | Takakura | H04W 76/15 |
| 2021/0051515 | A1* | 2/2021 | Huang-Fu | H04W 76/10 |
| 2021/0051516 | A1* | 2/2021 | Huang-Fu | H04W 76/10 |
| 2021/0227455 | A1* | 7/2021 | Aramoto | H04W 28/0289 |
| 2021/0227596 | A1* | 7/2021 | Aramoto | H04W 76/10 |
| 2022/0272660 | A1 | 8/2022 | Luetzenkirchen | |
| 2023/0101341 | A1* | 3/2023 | Lin | H04W 28/0289 370/329 |
| 2023/0328584 | A1* | 10/2023 | Huang-Fu | H04L 45/64 370/229 |
| 2023/0336241 | A1* | 10/2023 | Kim | H04B 7/18539 |
| 2024/0340837 | A1* | 10/2024 | Kumar | H04W 60/06 |

FOREIGN PATENT DOCUMENTS

| | | | |
|---|---|---|---|
| WO | WO202120632241 | A1 | 9/2020 |
| WO | WO2020209641 | A1 | 10/2020 |
| WO | WO-2021206322 | A1 * | 10/2021 ............ H04W 60/06 |

OTHER PUBLICATIONS

European EPO, office action for patent application 22197694.7, dated Feb. 20, 2023 (9 pages).

CP-211322, Apple et al. "Updates to Service Request for MUSIM leaving and Reject Paging in 5GS", 3GPP draft, Jun. 14, 2021, XP052029350.

C1-214301, Samsung et al. "Timer handling for MUSIM UEs (for 24,501)", 3GPP draft, Aug. 12, 2021, XP052040286.

Taiwan IPO, office action for the Taiwanese patent application 111136717 (no English translation is available), dated Dec. 19, 2022 (9 pages).

* cited by examiner

MUSIM SR PROCEDURE AND MM CONGESTION CONTROL

CROSS REFERENCE TO RELATED APPLICATION

This application claims priority under 35 U.S.C. § 119 from U.S. Provisional Application No. 63/249,076 entitled "MUSIM SR Procedure Transmission Failure," filed on Sep. 28, 2021, the subject matter of which is incorporated herein by reference.

TECHNICAL FIELD

The disclosed embodiments relate generally to wireless communication systems, and, more particularly, to handle NAS signaling connection release for MUSIM UEs upon detecting mobility management congestion.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (e.g., eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board has decided to focus the future NGMN activities on defining the end-to-end requirements for 5G new radio (NR) systems. The base stations in 5G NP systems are referred to as Next Generation Node-Bs (e.g., gNodeBs or gNBs).

Non-access stratum (NAS) is used to convey non-radio signaling between UE and the Mobility Management. Entity (MME) or the Access and Mobility Management Function (AMF) for an LTE/NR access. A NAS signaling connection can be established via an Attach procedure in 4G/LTE or via a registration procedure in 5G/NR, involving UE subscription and identity. The universal subscriber identity module (USIM) is one of several software applications that resides in the UE, called the universal integrated circuit card (UICC). As smartphones and services became more affordable, their users have tended to use different mobile subscriptions (i.e., USIM cards) for travel, business, and personal needs. Many UEs now support multiple USIM cards (MUSIM) for registration and operation over different USIM simultaneously.

Under NAS level mobility management congestion control, the AMF/MME may detect 5GMM/EMM signaling congestion and perform general NAS level congestion control. Under the 5GMM/EMM signaling congestion condition, the UE shall not initiate any NAS procedure and even if the UE does, the AMF/MME rejects 5GMM/EMM signaling requests from UEs. However, there are certain exceptions including: UE requests for emergency services, UE requests for emergency services fallback, UE requests for UEs configured for high priority access in selected PLMN, DEREGISTRATION REQUEST message, requests for mobile terminated services, triggered by paging or a notification procedure; and requests for initial registration or mobility and periodic registration update, when emergency is indicated by lower layers. When general NAS level congestion control is active, the AMF/MME may include a value for the mobility management back-off timer T3346 in the reject messages. The UE starts the timer T3346 with the value received in the 5GMM reject messages. To avoid that large numbers of UEs simultaneously initiate deferred requests, the AMF/MME selects the value for the timer T3346 for the rejected UEs so that timeouts are not synchronized.

For MUSIM UEs, when a UE establishes a NAS signaling connection over on a first USIM, the UE may need to switch a second USIM due to more important activities on the second USIM. If the UE supports MUSIM and requests the network to release the NAS signaling connection over the first USIM, the UE can initiate a service request procedure and send a service request message to the network. Under general NAS level congestion control, however, the UE is not allowed for such signaling request. A solution is desired to handle this abnormal scenario such that the UE can switch to the second USIM for other more important activities with better performance.

SUMMARY

A method of handling NAS signaling connection release under mobility management congestion control for MUSIM UE is proposed. A MUSIM UE has established a NAS signaling connection on a first USIM in connected mode. Later on, the MUSIM UE has more important job to be started on the second USIM. The MUSIM UE wishes to initiate a service request procedure by transmitting a service request to the network, to release the NAS signaling connection on the first USIM. However, under the 5GMM/EMM signaling congestion condition with timer T3346 running, the UE is not allowed to initiate MM procedures and AMF/MME rejects 5GMM/EMM signaling requests from UE. In one novel aspect, the MUSIM UE requests the network to release the NAS signaling connection while timer T3346 is still running. As a result, the MUSIM UE is able to start the more important job on the second USIM, or to improve user experience on the second USIM.

In one embodiment, a UE establishes a non-access stratum (NAS) signaling connection in a wireless communication network. The UE supports multiple universal subscriber identity module (MUSIM) and the NAS signaling connection is established on a first USIM. The UE receives a NAS signaling message from the network for activating congestion control, wherein the UE starts a congestion control timer associated with the first USIM. The UE initiates a service request procedure by transmitting a service request message to the network over the first USIM, wherein the service request message has a request type indicating to release the NAS signaling connection on the first USIM. The network, upon receiving the request from the UE, releases the NAS signaling connection on the first USIM and makes UE entering idle mode.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
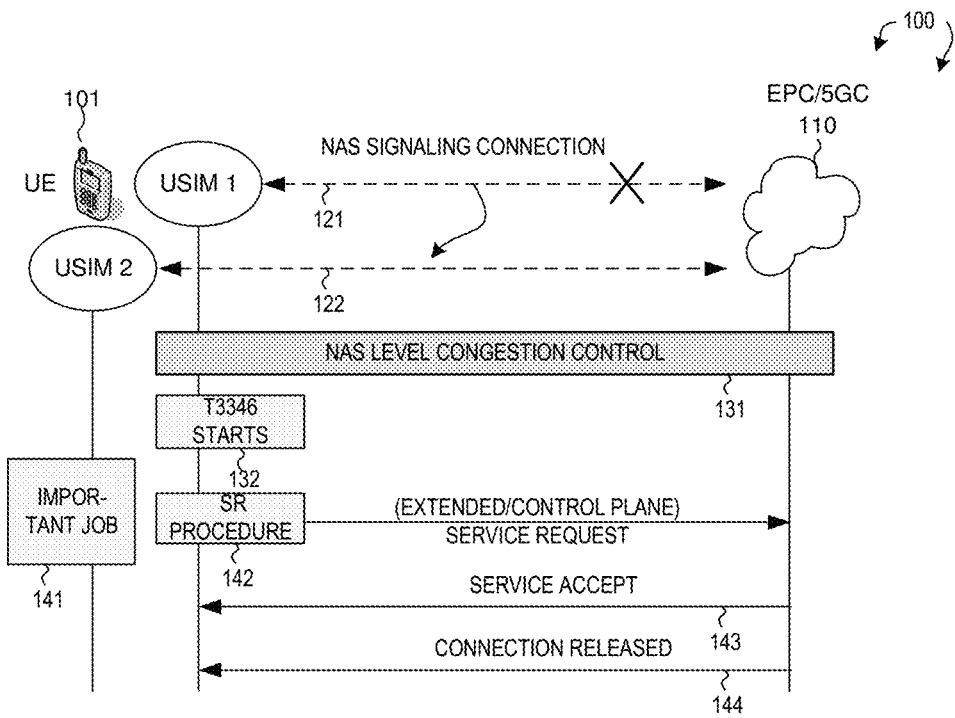
FIG. 1 illustrates a user equipment (UE) that supports Multiple USIM (MUSIM) and handles NAS signaling connection release when NAS signaling congestion control is activated in an EPS/5GS network in accordance with one novel aspect.

FIG. 1 illustrates a user equipment (UE) that supports Multiple USIM (MUSIM) and handles non-access stratum (NAS) signaling connection release when NAS signaling congestion control is activated in an EPS/5GS network in accordance with one novel aspect. In 3GPP NR, 5G NR access network (a plurality of base stations, e.g., Next Generation Node-Bs (gNBs), communicating with a plurality of mobile stations referred as user equipment (UEs). Orthogonal Frequency Division Multiple Access (OFDMA) has been selected for NR downlink (DL) radio access scheme due to its robustness to multipath fading, higher spectral efficiency, and bandwidth scalability. In both LTE and NR networks, Physical Downlink Control Channel (PDCCH) is used for downlink scheduling. Physical Downlink Shared Channel (PDSCH) is used for downlink data. Similarly, Physical Uplink Control Channel (PUCCH) is used for carrying uplink (UL) control information. Physical Uplink Shared Channel (PUSCH) is used for uplink data. In addition, physical random-access channel (PRACH) is used for non-contention-based RACH.

On the other hand, non-access stratum (NAS) is used to convey non-radio signaling between UE and the Mobility Management Entity (MME) or the Access and Mobility Management Function (AMF) for an LTE/NR access. In the example of FIG. 1, UE 101 supports multiple universal subscriber identity module (MUSIM) for registration and operation with EPC/5GC 110 over different USIM simultaneously. The two or more different USIMs can register to same EPS, same 5Gs, different EPSs, different 5GSs, or one or more EPS and one or more 5GS. When UE 101 receives paging and/or establishes a NAS signaling connection over on a first USIM1 (121), UE 101 may need to switch a second USIM2 due to more important activities are started or ongoing on the second USIM2 (122) with better performance and user experience.

UE with multiple USIMs is capable of maintaining a separate registration state with a PLMN (SNPN) for each USIM at least over 3GPP Access and supporting one or more of the MUSIM features: Connection Release Supported, Paging Cause Indication for Voice Service Supported, Reject Paging Request Supported, Paging Timing Collision Control, and Paging Restriction Supported. If UE 101 requests the network to release the NAS signaling connection or reject the paging over the first USIM, UE 101 can initiate a service request (SR) procedure and send a service request message to the network. The UE 101 can set the request type to "NAS Signaling connection release" in an EXTENDED SERVICE REQUEST message, a CONTROL PLANE SERVICE REQUEST message, or a SERVICE REQUEST message. Subsequently, the UE 101 should then receive an indication from the network that the NAS signaling connection is released by the network over the first USIM.

Under NAS level mobility management congestion control, an access and mobility function (AMF in 5G) or a mobility management entity (MME in 4G) may detect a 5GMM or EMM signaling congestion and perform general NAS level congestion control. Under the 5GMM/EMM signaling congestion condition, the UE is not allowed to initiate procedures and the AMF/MME rejects 5GMM/EMM signaling requests from UEs as specified in the 3GPP specification. When general NAS level congestion control is active, the AMF/MME may include a value for the mobility management back-off timer T3346 in the reject messages. The UE starts the timer T3346 with the value received in the 5GMM reject messages. Under the 5GMM/EMM signaling congestion condition with timer T3346 running, the AMF/MME rejects 5GMM/EMM signaling requests from UE, including the request from a MUSIM UE to release the NAS signaling connection over one USIM.

In accordance with one novel aspect, a method of handling NAS signaling connection release under congestion control for MUSIM UE is proposed. UE 101 has established a NAS signaling connection on USIM1, and UE 101 is in connected mode on USIM1. In step 131, the network detects signaling congestion and performs general NAS level congestion control. In step 132, UE 101 starts a timer T3346 with the value received in a 5GMM/EMM message. However, UE 101 has more important job to be started on USIM2 (step 141). In response, UE 101, while T3346 is still running, initiates a service request procedure by transmitting a service request to the network (step 142), to release the NAS signaling connection on USIM1. In step 143, UE 101 receives a service accept message from the network. In step 144, UE 101 receives another message from the network, indicating the NAS singling connection over USIM1 is released. As a result, UE 101 is able to start the more important job on the second USIM, or to improve user experience on the second USIM.

Figure 2:
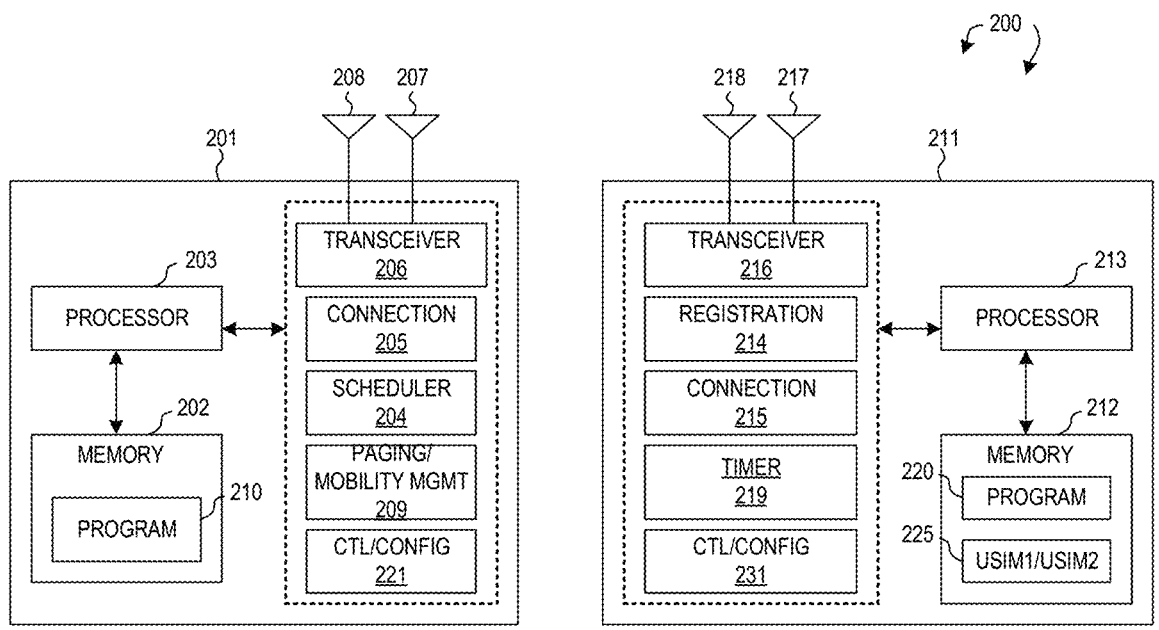
FIG. 2 is a simplified block diagram of a UE and a base station supporting NAS signaling release for MUSIM UEs in accordance with various embodiments of the present invention.

FIG. 2 is a simplified block diagram of wireless devices 201 and 211 in accordance with embodiments of the present invention. For wireless device 201 (e.g., a base station), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a user equipment), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 and multiple USIM cards 225 to control the operations of the wireless device 211.

The wireless devices 201 and 211 also include several functional modules and circuits that can be implemented and configured to perform embodiments of the present invention. In the example of FIG. 2, wireless device 201 is a base station that includes an RRC connection handling module 205, a scheduler 204, a paging and mobility management module 209, and a control and configuration circuit 221. Wireless device 211 is a UE that includes a connection handling module 215, a registration module 214, a paging and mobility handling module 219, and a control and configuration circuit 231. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow base station 201 and UE 211 to perform embodiments of the present invention.

In one example, the base station 201 establishes signaling connection with the UE 211 via connection handling circuit 205, schedules downlink and uplink transmission for UEs via scheduler 204, performs paging, mobility, and handover management via mobility management module 209, and provides control and configuration information to UEs via configuration circuit 221. The UE 211 performs registration with the network via registration module 214, establishes signaling connection via connection handling circuit 215, maintains timer 219, and obtains configuration information via control and configuration circuit 231. In one novel aspect, UE 211 supports MUSIM and handles the releasing of a NAS signaling connection over one USIM while T3346 is still running to improve the service of another USIM.

Figure 3:
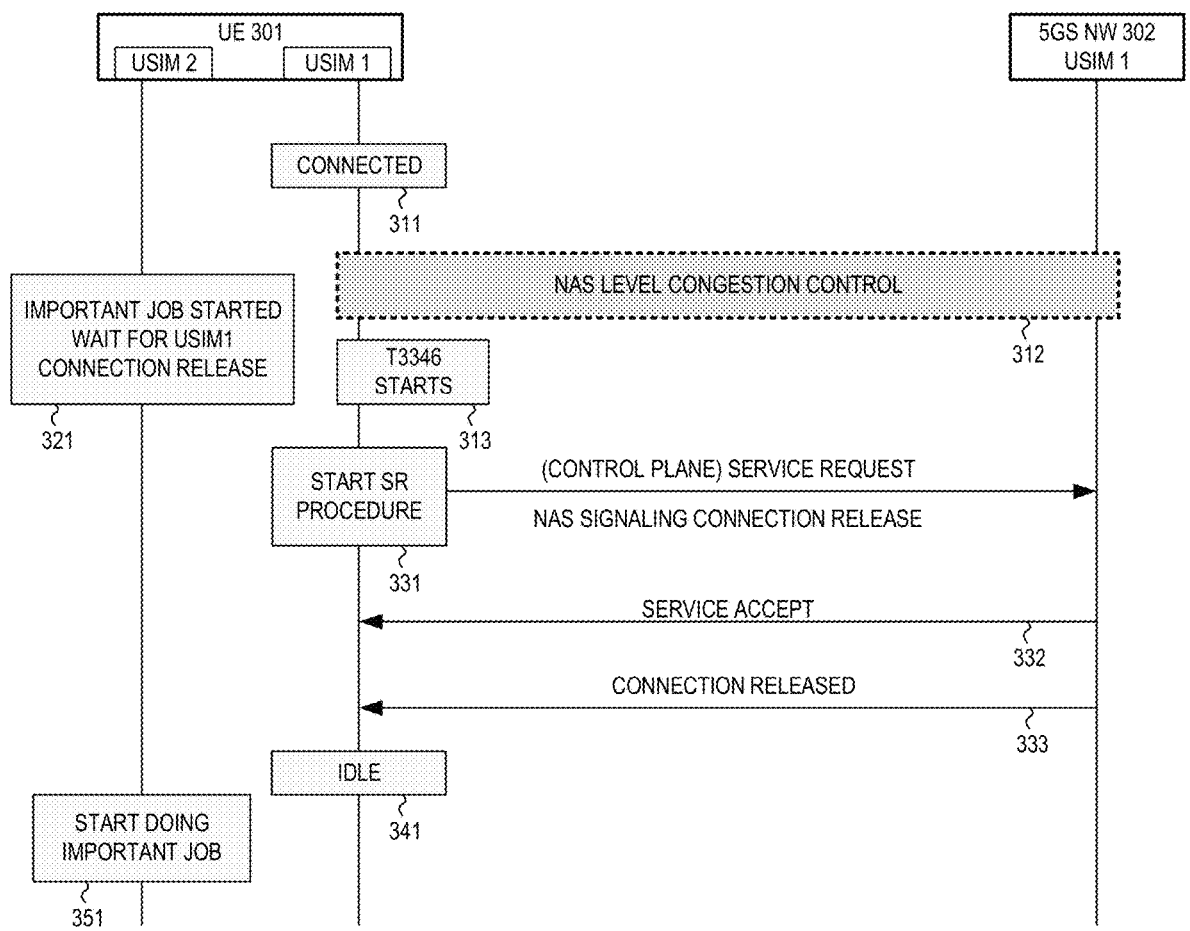
FIG. 3 illustrates one embodiment of handling NAS signaling connection release under a service request procedure for MUSIM UE when NAS signaling congestion control is activated in 5GS network in accordance with one novel aspect.

FIG. 3 illustrates one embodiment of handling NAS signaling connection release under a service request procedure for MUSIM UE when NAS signaling congestion control is activated in 5GS network in accordance with one novel aspect. UE 301 is equipped with multiple USIMs including USIM1 and USIM2. In step 311, UE 301 has registered to the network and established a NAS signaling connection and is in connected mode over USIM1. In step 312, the 5GS network 302 detects that a 5GMM signaling congestion. Under the 5GMM signaling congestion conditions, the AMF in 5GS rejects 5GMM signaling requests from UEs and the UE is not allowed to trigger service procedures. When general NAS level congestion control is active, the AMF may include a value for the mobility management back-off timer T3346 in the reject messages. In step 313, UE 301 starts timer T3346 with the value received in the 5GMM reject messages. In one example, timer T3346 is running while the NAS signaling connection is not yet released by the network.

In step 321, UE 301 determines that an important job is to be started on USIM2 and is expecting USIM1 to release the NAS signaling connection as soon as possible. For example, USIM2 is starting to do a very import job like mobile originated voice call while USIM1 is occupying the RF hardware resource doing non-urgent jobs like background download a new version of Android OS image. Although timer T3346 is still running, in step 331, UE 301 initiates a service request procedure by transmitting a SERVICE REQUEST message or a CONTROL PLANE SERVICE REQUEST message to the 5GS network 302. The request type of the message is set to NAS signaling connection release. In step 332, UE 301 receives a SERVICE ACCEPT message from the 5GS network 302. In step 333, UE 301 receives another message from the network indicating that the NAS signaling connection is released over USIM1. In step 341, UE 301 is in IDLE mode on USIM1. In step 351, UE 301 starts to perform the more important job on USIM2.

Figure 4:
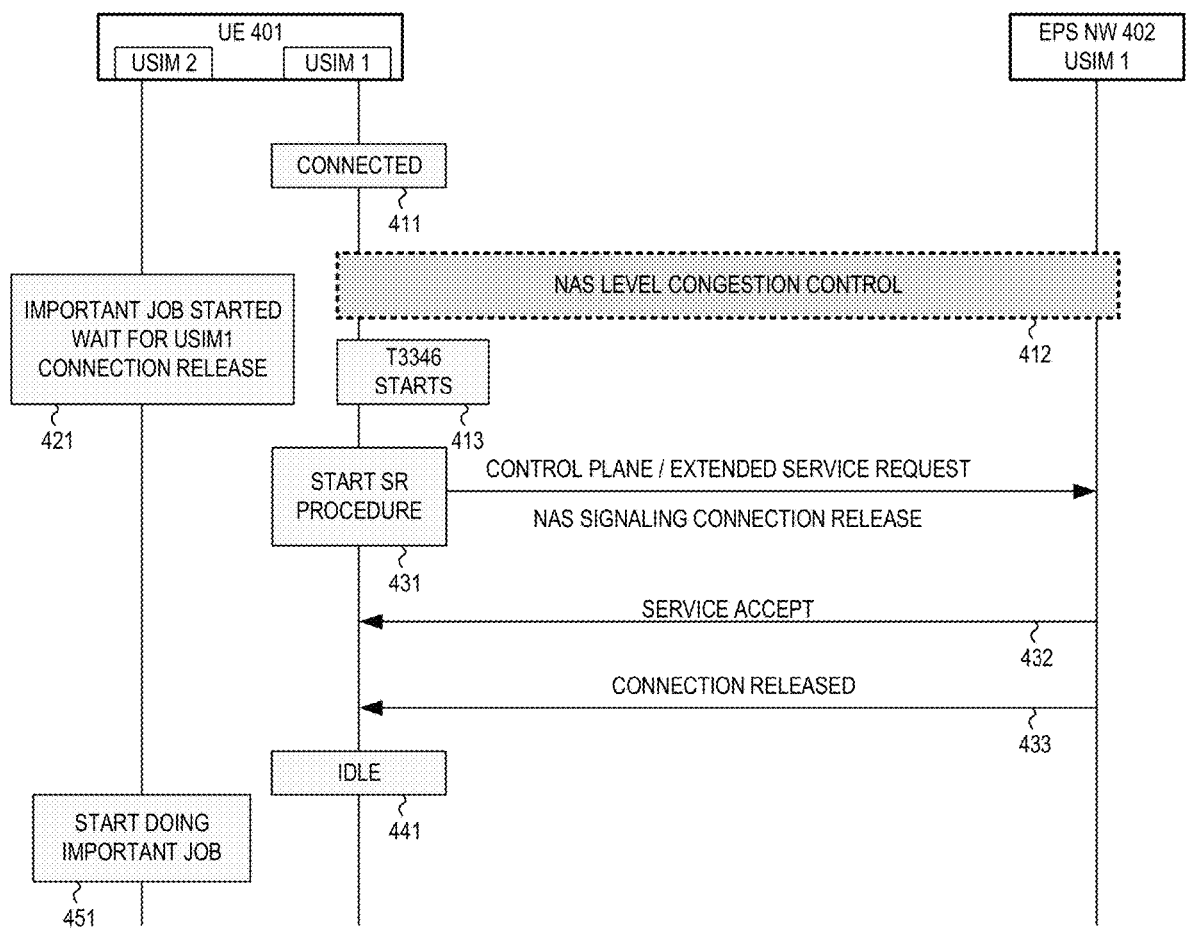
FIG. 4 illustrates one embodiment of handling NAS signaling connection release under service request procedure for MUSIM UE when NAS signaling congestion control is activated in EPS network in accordance with one novel aspect.

FIG. 4 illustrates one embodiment of handling NAS signaling connection release under service request procedure for MUSIM UE when NAS signaling congestion control is activated in EPS network in accordance with one novel aspect. UE 401 is equipped with multiple USIMs including USIM1 and USIM2. In step 411, UE 401 has established a NAS signaling connection and is in connected mode over USIM1. In step 412, the EPS network 402 detects that an EMM signaling congestion, and performs general NAS level congestion control. Under the EMM signaling congestion conditions, the MME in 5GS rejects EMM signaling requests from UEs. When general NAS level congestion control is active, the MME may include a value for the mobility management back-off timer T3346 in the reject messages. In step 413, UE 401 starts the timer T3346 with the value received in the EMM reject messages.

In step 421, UE 401 determines that an important job is to be started on USIM2 and is expecting USIM1 to release the NAS signaling connection. For example, USIM2 is starting to do a very import job like mobile originated voice call while USIM1 is occupying the RF hardware resource doing non-urgent jobs like background download a new version of Android OS image. Although timer T3346 is still running, in step 431, UE 401 initiates a service request procedure by transmitting a SERVICE REQUEST message, and EXTENDED SERVICE REQUEST message, or a CONTROL PLANE SERVICE REQUEST message to the EPS network 402. The request type of the message is set to NAS signaling connection release. In step 432, UE 401 receives a SERVICE ACCEPT message from the EPS network 402. In step 433, UE 401 receives another message from the network indicating that the NAS signaling connection is released over USIM1. In step 441, UE 401 is in IDLE mode on USIM1. In step 451, UE 401 starts to perform the more important job on USIM2.

Figure 5:
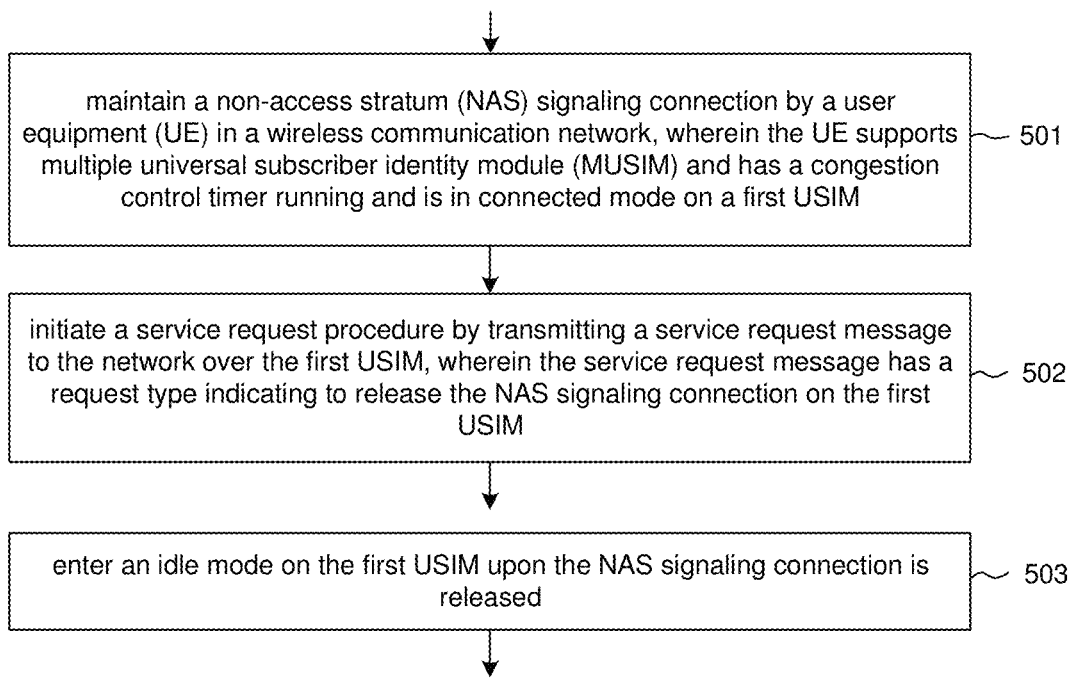
FIG. 5 is a flow chart of a method of handling NAS signaling connection release for MUSIM UE when NAS signaling congestion control is activated in accordance with one novel aspect of the present invention.

FIG. 5 is a flow chart of a method of handling NAS signaling connection release for MUSIM UE when NAS signaling congestion control is activated in accordance with one novel aspect of the present invention. In step 501, a UE maintains a non-access stratum (NAS) signaling connection in a wireless communication network. The UE supports multiple universal subscriber identity module (MUSIM), and the UE has a congestion control timer running and is in connected mode on a first USIM. In step 502, the UE initiates a service request procedure by transmitting a service request message to the network over the first USIM, wherein the service request message has a request type indicating to release the NAS signaling connection on the first USIM. In step 503, the network releases the NAS signaling connection on the first USIM and makes UE entering an idle mode.

Although the present invention is described above in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
maintaining a non-access stratum (NAS) signaling connection by a user equipment (UE) in a wireless communication network, wherein the UE supports multiple universal subscriber identity module (MUSIM) and has a congestion control timer running and is in connected mode on a first USIM, wherein the congestion control timer is T3346 timer, and wherein a T3346 timer value is provided by the network, and wherein the UE is not allowed to send mobility management signaling requests while the T3346 timer is still running;
initiating a service request procedure by transmitting a service request message to the network on the first USIM, wherein the service request message has a request type indicating to release the NAS signaling connection on the first USIM; and
entering an idle mode on the first USIM upon the NAS signaling connection is released.

2. The method of claim 1, wherein the network is an EPS network, the connected mode is EMM-CONNECTED mode, and wherein the service request message is a SERVICE REQUEST message, a CONTROL PLANE SERVICE REQUEST message, or an EXTENDED SERVICE REQUEST message.

3. The method of claim 1, wherein the congestion control timer is started upon receiving an evolved mobility management (EMM) reject message with a mobility management back-off timer T3346.

4. The method of claim 1, wherein the network is a 5GS network, the connected mode is 5GMM-CONNECTED mode, and wherein the request message is a SERVICE REQUEST message or a CONTROL PLANE SERVICE REQUEST message.

5. The method of claim 1, wherein the congestion control timer is started upon receiving a 5G mobility management (5GMM) reject message with a mobility management back-off timer T3346.

6. The method of claim 1, wherein the service request procedure is triggered by the UE initiating another application on a second USIM.

7. The method of claim 6, wherein the application is started on the second USIM upon the NAS signaling connection is released on the first USIM.

8. A User Equipment (UE), comprising:
a connection handling circuit that maintains a non-access stratum (NAS) signaling connection in a wireless communication network, wherein the UE supports multiple universal subscriber identity module (MUSIM) and is in connected mode on a first USIM;
a congestion control timer that is running, wherein the congestion control timer is T3346 timer, and wherein a T3346 timer value is provided by the network, and wherein the UE is not allowed to send mobility management signaling requests while the T3346 timer is still running; and
a transmitter that transmits a service request message to the network on the first USIM to initiate a service request procedure, wherein the service request message has a request type indicating to release the NAS signaling connection on the first USIM, and wherein the UE enters an idle mode on the first USIM upon the NAS signaling connection is released.

9. The UE of claim 8, wherein the network is an EPS network, the connected mode is EMM-CONNECTED mode, and wherein the service request message is a SERVICE REQUEST message, a CONTROL PLANE SERVICE REQUEST message, or an EXTENDED SERVICE REQUEST message.

10. The UE of claim 8, wherein the congestion control timer is started upon receiving an evolved mobility management (EMM) reject message with a mobility management back-off timer T3346.

11. The UE of claim 8, wherein the network is a 5GS network, the connected mode is 5GMM-CONNECTED mode, and wherein the service and the request message is a SERVICE REQUEST message or a CONTROL PLANE SERVICE REQUEST message.

12. The UE of claim 8, wherein the congestion control timer is started upon receiving a 5G mobility management (5GMM) reject message with mobility management back-off timer T3346.

13. The UE of claim 8, wherein the service request procedure is triggered by the UE initiating another application on a second USIM.

14. The UE of claim 13, wherein the application is started on the second USIM upon the NAS signaling connection is released on the first USIM.

* * * * *